Sept. 1, 1942.     M. M. BROCKWAY     2,294,363
VEHICLE BODY CONSTRUCTION
Filed Nov. 13, 1939
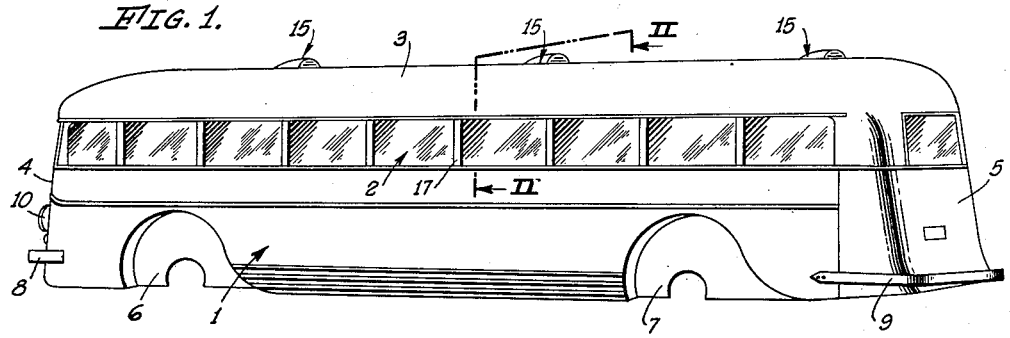
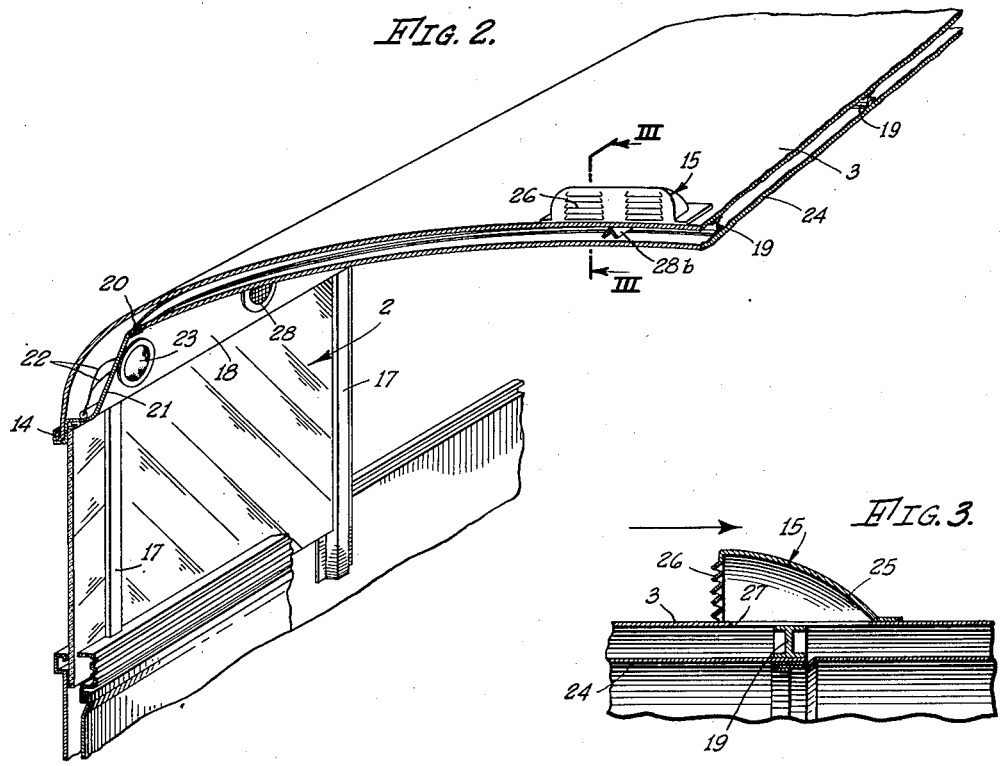
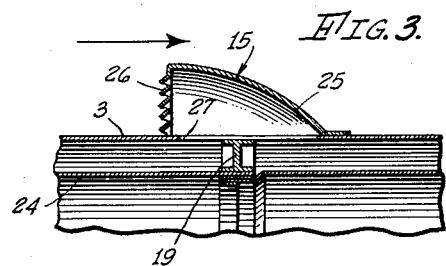
INVENTOR.
MURILLO M. BROCKWAY
BY
ATTORNEY.

Patented Sept. 1, 1942

2,294,363

UNITED STATES PATENT OFFICE 2,294,363

VEHICLE BODY CONSTRUCTION

Murillo M. Brockway, Los Angeles, Calif.

Original application October 7, 1938, Serial No. 233,786. Divided and this application November 13, 1939, Serial No. 304,079

3 Claims. (Cl. 98—2)

My invention relates to a vehicle body construction and has particular reference to a body construction for coaches, buses and the like in which a novel means is provided for ventilating and cooling the interior of the body.

This application is a division of my copending application Serial No. 233,786, filed October 7, 1938 entitled "Vehicle body construction."

An outstanding disadvantage found in the present body types resides in the fact that when these bodies are used for school buses and interurban coaches it is found very difficult to satisfactorily cool the interior of the coach without resorting to expensive cooling means. It has been found that the temperature of the interior of a coach of this type is readily raised to an undesirable value whenever the roof of the coach is exposed to the sun for any protracted period. While attempts have been made to utilize the space between the ceiling and roof skin of the body as a dead air insulation, the repeated heating and cooling condenses moisture within this space and causes rapid rusting and destruction of the metal plates and bracing members.

It is accordingly an object of my invention to provide a vehicle construction in which means is provided for ventilating and cooling the body interior.

It is a further object of my invention to provide a body construction of the character set forth in the preceding paragraphs in which an air space is provided between the upper and lower skin plates of the roof construction, together with means for changing the air in this air space.

It is a still further object of my invention to provide a body construction of the character set forth in the preceding paragraphs in which one or more longitudinally extending conduits are provided for mutually interconnecting air cells provided in the roof construction.

It is also an object of my invention to provide a body construction of the character set forth in the preceding paragraph in which a suction means is provided for withdrawing air from the interior of the body through the conduit and the cells and discharging it exteriorly of the body.

It is an additional object of my invention to provide a novel roof construction for a vehicle body which employs inner and outer skin plates and to incorporate therewith a means for circulating air between said plates so as to maintain the temperature of the inner plate at a moderate value and prevent overheating of the body interior.

Other objects and advantages of my invention will be apparent from a study of the following specification, read in connection with the accompanying drawing, wherein:

Fig. 1 is a perspective view illustrating the appearance of one class of vehicle body constructed in accordance with my invention;

Fig. 2 is a fragmentary view, partly in section and partly in perspective, taken along the line II—II of Fig. 1 to show the details of construction of the body illustrated in Fig. 1; and Fig. 3 is a sectional view taken along the line III—III of Fig. 2 to show the roof and ventilator construction of the body illustrated in Fig. 1.

Referring to the drawing I have illustrated in Fig. 1 one type of vehicle body, constructed in accordance with my invention, as including body sides 1 which are fitted with the desired number of window openings 2 and capped with a roof 3. Front and rear end panels 4 and 5 are provided which, together with a floor (not shown), cooperate with the aforementioned members to provide a hollow box-like body, closed on all sides. The body may include recesses 6 and 7 for the front and rear wheels, respectively, and be fitted with such accessories as front and rear bumpers 8 and 9 and headlights 10.

The body construction of my invention includes a pair of lower structural members (not shown) upon which is erected a plurality of vertically extending stud members 17 which are disposed in longitudinal spaced relation relative to each other. The preferred details of this construction are described and claimed in my aforementioned copending application.

The upper ends of the studs 17 are interconnected by means of a longitudinal structural member 18 to which is attached rafters 19 for supporting the roof 3. The rafters 19 are preferably attached to the upper horizontal member 18 at the location of the studs 17 and are carried in an arched manner from one side of the body to the other. The member 18 is preferably of a special rolled section including an upper flange portion 20 for engaging the rafters 19, a body portion 21 which is concave upwards and a drip mold portion 14 which lies directly below the central or body portion 21 and is carried outwardly over the studs 17 and attached to outer flanged faces thereof.

It will be noted that a space is provided between the central concave upwards portion 21 of the upper member 18 and the surface defined by the under side of the rafters 19. I prefer to use this space as a combination ventilating duct and wiring conduit. As a wiring conduit, wires 22 are carried through the aforementioned space to supply lighting units 23 which may be mounted in the central portion 21 of the upper longitudinal member 18 for illuminating the interior of the vehicle body.

Inasmuch as the roof 3 is supported by the rafters 19 and inasmuch as I prefer to securely attach ceiling plates 24 to the under side of the rafters 19, it will be seen that the aforementioned ventilating duct space interconnects all of the air spaces between the roof 3 and the ceiling plates 24 which are separated from each other by the rafters 19. I prefer to mount a plurality of suction means or ventilators 15 on the roof 3 of the vehicle body in a fashion which is best shown in Fig. 3.

The ventilator 15 includes an upper housing 25, which is securely attached to the roof 3 and slopes upwardly and to the rear of the body. The rear portion of the housing 25 is provided with suitable louvers or ventilating openings 26 communicating with the space within the housing 25. I provide an opening 27 in the roof 3 so that a communication is established between the interior of the housing 25 of the ventilator 15 and the air space between the roof 3 and the ceiling 24. I prefer to place each of the ventilators 15 over one of the rafters 19 so that the ventilator communicates with an air space on either side of the rafter 19, so that one ventilator may simultaneously serve two of the aforementioned air spaces.

As the vehicle is propelled forward in the direction indicated by the arrow 28a of Fig. 3, a zone of relatively low pressure air is established immediately adjacent the louvers 26 in a manner well known to those skilled in the art to which this invention appertains. The reduction of pressure at this point causes air to be withdrawn from the interior of the housing 25 through the louvers 26. This causes air to flow from the interior of the body through a plurality of suitable ventilating openings 28, which may be provided in the central portion 21 of the upper longitudinal member 18 and disposed in spaced relation therealong, through the ventilating duct opening formed by said member and thence upwards through the air spaces in the roof structure between the roof 3 and the ceiling 24 and out the ventilators 15 in the manner previously described.

In order to balance this flow of air between opposite sides of the body, I provide a deflector 28b which may be of an angle shape disposed with the apex of the angle uppermost and extending between adjacent rafters 19. The deflector 28b is preferably sufficiently large to fill the space between the upper and lower top plates 3 and 24 and is located midway of the ventilator 15 so as to equally divide its action between the two body sides.

It will be readily observed that whenever the roof of the vehicle is exposed to the direct rays of the sun for any protracted period that the air confined between the roof 3 and the ceiling 24 may be heated to an extremely high temperature, if such air is allowed to remain therebetween. In the current methods of manufacture of bodies of this type, it is customary to omit any means for changing the air in this air space, with the result that the air becomes heated to a very high temperature. This high temperature air then subsequently heats the ceiling 24 and operates to raise the interior temperature of the vehicle to an undesirable high value.

It is readily seen that I have provided a means of continually changing the air in this air space and have thus provided a means for maintaining the interior temperature of the vehicle body at a value substantially lower than that heretofore obtainable without employing special cooling devices. By frequently changing the air in this fashion, I prevent the condensation of moisture from the air and thereby avoid the rust and oxidation difficulties common to the present methods of construction. Although the air drawn through these air spaces may be heavily laden with moisture, condensation is prevented because the air will not be cooled to a lower temperature than its entering temperature.

While I have shown and described the preferred embodiment of my invention, I do not desire to be limited to any of the details of construction shown or described herein, except as defined in the appended claims.

I claim:

1. In a vehicle body comprising a pair of body sides, a floor, an upwardly arched top including an inner top plate and an outer top plate, and a plurality of laterally extending rafters for supporting said top, said rafters being spaced longitudinally of the top to define an air cell between each adjacent pair of rafters, the combination of a longitudinally extending structural member disposed adjacent the junction between said top and said body side and forming a part of said body side, said member being arched downwardly to define a passageway between said member and said top; means communicating between each of said cells and said passageway; an orifice in said member communicating between said passageway and the interior of said body; and an opening in said outer top plate whereby air may be circulated from the interior of said body through said orifice, passageway, cell and opening to the exterior of said body.

2. In a vehicle body comprising a pair of body sides, a floor, an upwardly arched top including an inner top plate and an outer top plate, and a plurality of laterally extending rafters for supporting said top, said rafters being spaced longitudinally of the top to define an air cell between each adjacent pair of rafters, the combination of a longitudinally extending structural member disposed adjacent the junction between said top and said body side and forming a part of said body side, said member being arched downwardly to define a passageway between said member and said top; means communicating between each of said cells and said passageway; an orifice in said member communicating between said passageway and the interior of said body; an opening in said outer top plate; and a suction means disposed exteriorly of said body and connected to said opening for withdrawing air from the interior of said body through said orifice, passageway and cell and discharging said air exteriorly of said body.

3. In a vehicle body comprising a pair of body sides, an upwardly arched top extending therebetween and including an inner top plate and an outer top plate, and a plurality of laterally extending rafters for supporting said top, said rafters being spaced longitudinally of the top to define an air cell between each adjacent pair of rafters, the combination of: means communicating with two adjacent cells for withdrawing air from said cells; means extending longitudinally of said body and disposed adjacent the junction of said top and said sides for defining a longitudinally extending air passage communicating with all of said cells; and a plurality of openings in said last named means communicating with the interior of said body, whereby air entering said openings may be circulated through said passage to both of said adjacent cells.

MURILLO M. BROCKWAY.